US008659853B2

(12) United States Patent
Han et al.

(10) Patent No.: US 8,659,853 B2
(45) Date of Patent: Feb. 25, 2014

(54) SENSOR ARRANGEMENT (75) Inventors: Guchang Han, Singapore (SG); Jinjun Qiu, Singapore (SG); Li Wang, Singapore (SG); Wee Kay Yeo, Singapore (SG); Chenchen Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 8 days.

(21) Appl. No.: 13/394,613

(22) PCT Filed: Sep. 7, 2010

(86) PCT No.: PCT/SG2010/000331
§ 371 (c)(1),
(2), (4) Date: May 22, 2012

(87) PCT Pub. No.: WO2011/028185
PCT Pub. Date: Mar. 10, 2011

(65) Prior Publication Data
US 2012/0225322 A1  Sep. 6, 2012

(30) Foreign Application Priority Data
Sep. 7, 2009 (SG) .................. 200905929-6

(51) Int. Cl.
*G11B 5/39* (2006.01)
*G11B 5/127* (2006.01)
(52) U.S. Cl.
USPC ..................... 360/314; 360/324.11

(58) Field of Classification Search
USPC ............... 360/324.2, 314, 324, 324.1, 324.11
See application file for complete search history.

(56) References Cited

U.S. PATENT DOCUMENTS

| 5,668,688 | A | * | 9/1997 | Dykes et al. | 360/324.1 |
|---|---|---|---|---|---|
| 5,780,176 | A | * | 7/1998 | Iwasaki et al. | 428/811.2 |
| 6,005,798 | A | * | 12/1999 | Sakakima et al. | 365/158 |
| 6,259,586 | B1 | * | 7/2001 | Gill | 360/324.2 |
| 6,643,103 | B1 | * | 11/2003 | Trindade | 360/314 |
| 6,657,823 | B2 | * | 12/2003 | Kawato | 360/314 |
| 6,661,620 | B2 | * | 12/2003 | Seigler et al. | 360/314 |
| 6,667,861 | B2 | * | 12/2003 | Gill | 360/324.11 |
| 6,999,285 | B2 | * | 2/2006 | Gill | 360/314 |
| 7,016,160 | B2 | * | 3/2006 | Mao et al. | 360/314 |
| 7,116,529 | B2 | * | 10/2006 | Yoshikawa et al. | 360/324.1 |
| 7,116,530 | B2 | * | 10/2006 | Gill | 360/324.1 |
| 7,130,167 | B2 | * | 10/2006 | Gill | 360/324.12 |
| 7,342,753 | B2 | * | 3/2008 | Gill | 360/324.12 |
| 7,413,636 | B2 | * | 8/2008 | Lin et al. | 204/192.2 |
| 7,436,632 | B2 | * | 10/2008 | Li et al. | 360/315 |
| 7,511,926 | B2 | * | 3/2009 | Gill | 360/314 |
| 8,133,363 | B2 | * | 3/2012 | Lin et al. | 204/192.2 |
| 2004/0061978 | A1 | * | 4/2004 | Kawato | 360/314 |
| 2007/0297102 | A1 | * | 12/2007 | Gill | 360/324.11 |
| 2010/0118448 | A1 | * | 5/2010 | Yasui et al. | 360/324.1 |

* cited by examiner

*Primary Examiner* — Brian Miller
(74) *Attorney, Agent, or Firm* — K. David Crockett, Esq.; Niky Economy Syrengelas, Esq.; Crockett & Crockett, PC (57) ABSTRACT

An ultrahigh differential current perpendicular to the plane dual spin valve read head with high pinning stability. The high pinning stability may be achieved using the same anti-ferromagnetic materials for two spin valves by introducing a double synthetic anti-ferromagnetic structure in one of the two spin valves.

20 Claims, 9 Drawing Sheets

Figure 3C $\Delta V = |\Delta V1| + |\Delta V2|$

Figure 3B $\Delta V = |\Delta V1| - |\Delta V2|$

SENSOR ARRANGEMENT

CROSS-REFERENCE TO RELATED APPLICATION

This application claims the benefit of priority of Singapore patent application number 200905929-6 filed on 7 Sep. 2009, the contents of which is hereby incorporated by reference in its entirety for all purposes.

TECHNICAL FIELD

Embodiments relate to a sensor arrangement or a magnetic recording read head, in particular, to a differential current perpendicular to the plane (CPP) dual spin valve magnetic recording read head for perpendicular magnetic recording.

BACKGROUND

Current magnetic recording read head may include two shields at both sides of the read head. Shield to shield spacing (SSS) of the read head shall generally be smaller than two bits length to avoid reading flux from adjacent transitions. The minimum SSS may be determined by total thickness of the read head multi-layers.

The read head may generally include a seed layer, an anti-ferromagnetic (AFM) layer, a pinned layer (PL), an anti-ferromagnetic coupling (AFC) layer, a reference layer (RL), a spacer layer (SL), a free layer (FL) and a capping layer (CL). The seed layer may be used to develop a suitable lattice structure of read head layers and the AFM layer may be used to pin the PL magnetization by exchange coupling between the AFM layer and the PL. The respective PL, AFC layer and RL may form a synthetic anti-ferromagnetic (SAF) coupling structure. The SAF coupling structure may provide a highly stable unidirectional anisotropy when the PL may be pinned by the AFM layer. The magnetization direction of the RL, which may always be anti-parallel to that of the PL, thus can be fixed in a desired direction against disturbance of any magnetic field. High stability in the SAF structure may have been demonstrated and may be widely employed in today's magnetic recording read head. In order to get a linear response of the read head, the FL may be biased by a pair of permanent magnets (PM) located at both sides of the read head in an across-track direction so that the magnetization easy axis of the FL may be perpendicular to the RL's magnetization. Magnetic thickness ($M_{SPL}t_{PL}$, $M_{SRL}t_{RL}$) of the respective PL and the RL, which may be a product of physical thickness ($t_{PL}$, $t_{RL}$) and moment ($M_{SPL}$, $M_{SRL}$) of a material, may be selected to be almost the same so that net magneto-static field from the PL and the RL at the FL may be equal to zero, effectively eliminating biasing or shifting from the operating point of the read head. The magnetization pinning direction of the PL and thus the RL may be set through annealing the read head at a temperature higher than blocking temperature ($T_B$) of the AFM layer, then reducing the temperature to a temperature below $T_B$ under a magnetic field. The PL magnetization may thus be fixed parallel to an applied field direction during an annealing process. The pinning direction may be either pointed to or away from an air bearing surface (ABS) in a single spin valve.

It may be well established that all these respective layers may be playing their unique roles in read head performance. Since total thickness of these layers may be generally larger than 20 nm in today's technology, linear density of the read head may be limited to a maximum value of about 2540 Kbpi (bits-per-inch).

Differential CPP dual spin valve magnetic recording read head may have been proposed to overcome linear resolution limited by the SSS, as the magnetic recording read head with the differential CPP dual spin valve structure may not require any magnetic shields.

Differential CPP dual spin valve magnetic recording read head may include two spin valves separated by a gap layer. To achieve a differential effect, the magnetization of the reference layer in the two spin valves may have to be aligned in anti-parallel (AP). Some ways may have been proposed to achieve the AP magnetization state of two reference layers. One way may be to grow the two AFM layers at opposite magnetic fields. However, this process may demonstrate difficulty in control of good pinning directions and thus pinning field may be low. Another way may be to use different AFM materials which may have different blocking temperatures. The AP magnetization state of the RL in the two spin valves may be set by heat treatment in one field direction at higher temperatures (>higher $T_B$), then in another opposite field direction at lower temperatures (lower $T_B$<T<higher $T_B$). However, in this case, the two blocking temperatures should be well separated so that no interference may be caused during setting of exchange bias directions of different AFM layers. The issue may be that the lower $T_B$ may not be too low to achieve high pinning stability, while the higher $T_B$ may not be too high to avoid the diffusion at high temperature annealing. In addition, the two AFM materials shall provide good corrosive resistance and shall be grown on a same lattice structure. As an additional AFM material may be required, this design may increase cost of a sputtering system for deposition of the read head multi-layers.

Therefore, there is a need to provide for an alternative magnetic reader or magnetic recording read head which may overcome or at least alleviate some of the above-mentioned problems.

SUMMARY

In various embodiments, a sensor arrangement may be provided. The sensor arrangement may include a sensor including a first spin valve. The first spin valve may include a first free layer structure; a first pinning structure disposed over the first free layer structure; and a first anti-ferromagnetic layer disposed over the first pinning structure. The sensor may further include a second spin valve. The second spin valve may include a second free layer structure; a second pinning structure disposed over the second free layer structure; and a second anti-ferromagnetic layer disposed over the second pinning structure. The sensor may also include a separator structure positioned between the first spin valve and the second spin valve such that the separator structure may be in contact with the first free layer structure and the second free layer structure. The first pinning structure may include an odd number of first ferromagnetic layers and the second pinning structure may include an even number of second ferromagnetic layers so as to enable the sensor to provide a differential signal when a current flows through the sensor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments may be combined with one or more other embodiments to form new embodiments.

Various embodiments provide an ultrahigh resolution differential CPP spin valve read head with high pinning stability. The high pinning stability may be achieved using the same AFM materials for two spin valves by introducing a double SAF structure in one of the two spin valves.

Figure 1:
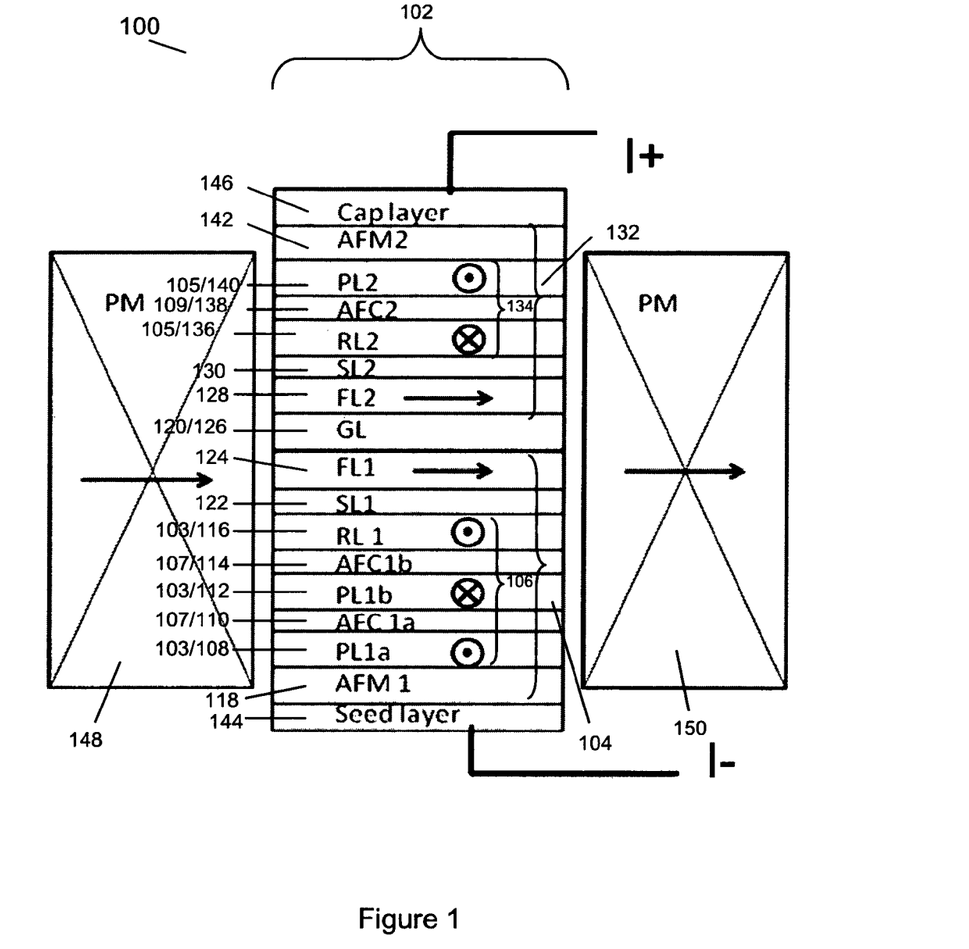
FIG. 1 shows a schematic of a differential current perpendicular to the plane (CPP) dual spin valve magnetic recording read head including two spin valves physically separated by a gap layer, with parallel magnetization states of two free layer structures in the two spin valves and biased by a pair of permanent magnets according to an embodiment.

FIG. 1 shows a schematic of a differential current perpendicular to the plane (CPP) dual spin valve magnetic recording read head 100 including two spin valves 104, 132 physically separated by a gap layer 126, with parallel magnetization states of two free layer structures 124, 128 in the two spin valves 104, 132 and biased by a pair of permanent magnets 148, 150 according to an embodiment.

In FIG. 1, the differential CPP dual spin valve magnetic recording read head or sensor arrangement 100 may include a sensor 102.

The sensor 102 may include a first spin valve 104, the first spin valve 104 including a layered arrangement. The first spin valve 104 may include a first free layer structure 124; a first spacer layer (SL1) 122 disposed over the first free layer structure 124; a first pinning structure 106 disposed over the first spacer layer 122; and a first anti-ferromagnetic layer (AFM1) 118 disposed over the first pinning structure 106.

The sensor 102 may also include a second spin valve 132, the second spin valve 132 including a layered arrangement. The second spin valve 132 may include a second free layer structure 128; a second spacer layer (SL2) 130 disposed over the second free layer structure 128; a second pinning structure 134 disposed over the second spacer structure 130; and a second anti-ferromagnetic layer (AFM2) 142 disposed over the second pinning structure 134.

The sensor 102 may further include a separator structure 120 positioned between the first spin valve 104 and the second spin valve 132 such that the separator structure 120 may be in contact with the first free layer structure 124 and the second free layer structure 128.

The first pinning structure 106 may include an odd number of first ferromagnetic layers 103 and the second pinning structure may include an even number of second ferromagnetic layers 105 so as to enable the sensor 102 to provide a differential signal when a current flows through the sensor 102.

The first anti-ferromagnetic layer 118 and the second anti-ferromagnetic layer 142 may be of the same material.

The first pinning structure 106 may further include an even number of first anti-ferromagnetic coupling layers 107, wherein each of the odd number of first ferromagnetic layers 103 may be separated from another of the odd number of first ferromagnetic layers 103 by at least one of the even number of first anti-ferromagnetic coupling layers 107. The first pinning structure 106 may include at least one more layer of the odd number of first ferromagnetic layers 103 than the even number of first anti-ferromagnetic coupling layers 107.

The second pinning structure 134 may further include an odd number of second anti-ferromagnetic coupling layers 109, wherein each of the even number of second ferromagnetic layers 105 may be separated from another of the even number of second ferromagnetic layers 105 by at least one of the odd number of second anti-ferromagnetic coupling layers 109. The second pinning structure 134 may include at least one more layer of the even number of second ferromagnetic layers 105 than the odd number of second anti-ferromagnetic coupling layers 109.

The odd number of first ferromagnetic layers 103 may include a first pinned layer (PL1a) 108, a first further pinned layer (PL1b) 112 and a first reference layer (RL1) 116 and the even number of first anti-ferromagnetic coupling layers 107 may include a first sub-anti-ferromagnetic coupling layer (AFC1a) 110 and a first further sub-anti-ferromagnetic coupling layer (AFC1b) 114.

The first sub-anti-ferromagnetic coupling layer 110 may be disposed between the first pinned layer 108 and the first further pinned layer 112 so as to form an anti-ferromagnetic coupling between the first pinned layer 108 and the first further pinned layer 112 such that the first pinned layer 108 may be of a different magnetization direction from the first further pinned layer 112. The first further sub-anti-ferromagnetic coupling layer 114 may be disposed between the first further pinned layer 112 and the first reference layer 116 so as to form an anti-ferromagnetic coupling between the first further pinned layer 112 and the first reference layer 116 such that the first further pinned layer 112 may be of a different magnetization direction from the first reference layer 116.

The even number of second ferromagnetic layers 105 may include a second reference layer (RL2) 136 and a second pinned layer (PL2) 140 and the odd number of second anti-ferromagnetic coupling layers 109 may include a second sub-anti-ferromagnetic layer (AFC2) 138.

The second sub-anti-ferromagnetic coupling layer 138 may be disposed between the second reference layer 136 and the second pinned layer 140 so as to form an anti-ferromagnetic coupling between the second reference layer 136 and the second pinned layer 140 such that the second pinned layer 140 may be of a different magnetization direction from the second reference layer 136.

The first anti-ferromagnetic layer 118 may be disposed in contact with the first pinned layer 108 such that the first anti-ferromagnetic layer 118 may be configured to fix a magnetization direction of the first pinned layer 108 through exchange coupling between the first anti-ferromagnetic layer 118 and the first pinned layer 108.

The second anti-ferromagnetic layer 142 may be disposed in contact with the second pinned layer 140 such that the second anti-ferromagnetic layer 142 may be configured to fix a magnetization direction of the second pinned layer 140 through exchange coupling between the second anti-ferromagnetic layer 142 and the second pinned layer 140.

The first reference layer 116 and the second reference layer 136 may be of different magnetization directions.

In an embodiment, the first anti-ferromagnetic layer 118 and the second anti-ferromagnetic layer 142 may be of the same material and may be of the same magnetization direction. Therefore, the first pinned layer 108 and the second pinned layer 140 may also be of the same magnetization direction due to exchange coupling between the respective first anti-ferromagnetic layer 118 and the first pinned layer 108 and between the second anti-ferromagnetic layer 142 and the second pinned layer 140.

The first further pinned layer 112 may include a magnetic thickness substantially equal to a combined magnetic thickness of the first pinned layer 108 and the first reference layer 116 so that the magnetic thickness of the total first pinning structure 106 may be close to zero to enhance the pinning field (the pinning field is inversely proportional to the magnetic thickness of the first pinning structure 106).

In various embodiments, the magnetic thickness may be defined as the product of the saturation magnetization ($M_S$) and the physical thickness (t) of the layers. As an example, it may not be necessary to have a completely cancelled magnetic thickness in the respective first pinning structure 106 and second pinning structure 134. In this regard, using the first pinning structure 106 as an example, a slightly larger magnetic thickness of the respective first pinned layer 108 or the first further pinned layer 112 than the first reference layer 116 may be beneficial to reduce the magnetostatic field from the first pinning structure 106 acting on the first free layer structure 124. Similarly, for the second pinning structure 134, a slightly larger magnetic thickness of the second pinned layer 140 than the second reference layer 136 may be beneficial to reduce the magnetostatic field from the second pinning structure 134 acting on the second free layer structure 128.

In an embodiment, the respective first pinned layer 108, the first further pinned layer 112, the first reference layer 116, the first free layer structure 124, the second pinned layer 140, the second reference layer 136 and the second free layer structure 128 may include the same or different material. As an example, each of the respective first pinned layer 108, the first further pinned layer 112, the first reference layer 116, the first free layer structure 124, the second pinned layer 140, the second reference layer 136 and the second free layer structure 128 may include any number of ferromagnetic layers with different materials and orders, like the first further pinned layer 112 may include CoFe/CoFeB, and the first reference layer 116 may include CoFeB/CoFe or CoFe/CoFeB. Further, the respective first pinned layer 108, the first further pinned layer 112, the first reference layer 116, the first free layer structure 124, the second pinned layer 140, the second reference layer 136 and the second free layer structure 128 may also include a single layer or a multilayer structure, for example, CoFe/NiFe for the first free layer structure 124; the second free layer structure 128, CoFe/CoFeB for the first reference layer 116; the second reference layer 136.

In an embodiment, each of the respective first anti-ferromagnetic layer 118 and the second anti-ferromagnetic layer 142 may include an anti-ferromagnetic material selected from a group consisting of IrMn, $Ir_2Mn$, PtMn, FeMn, for example.

In an embodiment, each of the respective first ferromagnetic layers 103 and the second ferromagnetic layers 105 may include a ferromagnetic material selected from a group consisting of transition metals and their alloys, half and full Heusler alloys for example. The transition metals and their alloys may include Fe, Co, Ni, CoFe, CoFeB, NiFe for example and the half and full Heusler alloys may include CoMnAl, CoMnSi, CoMnGe, CoCrAl, FeCrSi, NiMnSb, $Ni_2CuSi$, $Co_2CuSi$ for example.

Each of the respective first anti-ferromagnetic coupling layer 107 and the second anti-ferromagnetic coupling layer 109 may also include an anti-ferromagnetic coupling material or a metal material selected from a group consisting of Cu, Ru, Cr, Ag, for example.

The first free layer structure 124 may include a magnetization direction parallel or anti-parallel to the second free layer structure 128. As an example in FIG. 1, the first free layer structure 124 may include a magnetization direction parallel to the second free layer structure 128 as shown by the arrows.

The separator structure 120 may include a gap layer (GL) 126. The separator structure 120 may include a single layer structure or a multi-layer structure for example Ru/Ta/Ru or Ru/Cu/Ru depending on user and design requirements.

In an embodiment, each of the respective first spacer layer 122 and the second spacer layer 130 may include an insulator, a metal or a Heusler alloy for example. The gap layer 126 may include a non-magnetic electrically conducting material. As a further example, the gap layer 126 may include metals such as Ta, Ru, Al, Cr and Heusler alloy such as CuCrAl for example.

In an embodiment, each of the respective first free layer structure 124 and the second free layer structure 128 may include either a single layer or a multi-layer of ferromagnetic materials selected from a group consisting of transition metals and their alloys, half and full Heusler alloys for example.

As an example in FIG. 1, the first pinning structure 106 may include three first ferromagnetic layers 103 (i.e. the first pinned layer 108, the first further pinned layer 112, the first reference layer 116) and two first anti-ferromagnetic coupling layers 107 (i.e. the first sub-anti-ferromagnetic coupling layer 110, the first further sub-anti-ferromagnetic coupling layer 114). As a further example, the first pinning structure may include five first ferromagnetic layers 103 and two first anti-ferromagnetic coupling layers 107. As an example, the first pinning structure 106 may include only one ferromagnetic layer 103 (i.e. first reference layer 116). As a yet further example, the first pinning structure may include five first ferromagnetic layers 103 and four first anti-ferromagnetic coupling layers 107. The first pinning structure 106 may include any suitable odd number of first ferromagnetic layers 103 and any suitable even number of first anti-ferromagnetic coupling layers 107, wherein each of the odd number of first ferromagnetic layers 103 may be separated from another of the odd number of first ferromagnetic layers 103 by at least one of the even number of first anti-ferromagnetic coupling layers 107.

The second pinning structure 134 may include two second ferromagnetic layers 105 (i.e. the second reference layer 136 and the second pinned layer 140) and one second anti-ferromagnetic coupling layer 109 (i.e. the second sub-anti-ferromagnetic coupling layer 138). As a further example, the second pinning structure 134 may include four second ferromagnetic layers 105 and one second anti-ferromagnetic coupling layer 109. As a yet further example, the second pinning structure may include four second ferromagnetic layers 105 and three second anti-ferromagnetic coupling layers 109. The second pinning structure 134 may further include any suitable even number of second ferromagnetic layers 105 and any suitable odd number of second anti-ferromagnetic coupling layers 109, wherein each of the even number of second ferromagnetic layers 105 may be separated from another of the even number of second ferromagnetic layers 105 by at least one of the odd number of second anti-ferromagnetic coupling layers 109.

The sensor 102 may further include a seed layer 144 disposed on the first anti-ferromagnetic layer 118. In an embodiment, the seed layer 144 may include a metal selected from a group consisting of Ta, NiFe, Cr, NiFeCr, CrRu, for example.

The sensor 102 may further include a capping layer 146 disposed on the second anti-ferromagnetic layer 142. In an embodiment, the capping layer 146 may include any conductive materials such as Ta, Ti, Ru, Au and Cr.

The sensor arrangement 100 may further include a first permanent magnet 148 and a second permanent magnet 150, wherein the first permanent magnet 148 may be arranged on one side of the sensor 102 and the second permanent magnet 150 may be arranged on an opposing side of the sensor 102 so as to bias the first free layer structure 124 and the second free layer structure 128.

In an embodiment, the first spin valve 104 may include a double synthetic anti-ferromagnetic coupling pinning structure and the second spin valve 132 may include a single synthetic anti-ferromagnetic coupling pinning structure. As an example in FIG. 1, the first spin valve 104 may be located on the bottom and the second spin valve 132 may be located on the top. However, the locations of the first spin valve 104 and the second spin valve 132 may be exchanged depending on user and design requirements.

The first spin valve 104 including the double synthetic anti-ferromagnetic coupling pinning structure and the second spin valve 132 including the single synthetic anti-ferromagnetic coupling pinning structure may provide a natural solution to pinning directions in the first spin valve 104 and the second spin valve 132 without the need of using different anti-ferromagnetic materials and growing anti-ferromagnetic materials in different magnetic field directions. As the antiparallel magnetization states of the first reference layer 116 and the second reference layer 136 may be achieved with the same pinning direction of the magnetizations of the first pinned layer 108 and the second pinned layer 140, the same anti-ferromagnetic material may be used for the first anti-ferromagnetic layer 118 and the second anti-ferromagnetic layer 142.

Further, the double synthetic anti-ferromagnetic coupling pinning structure may provide a similar pinning strength as the single synthetic anti-ferromagnetic coupling pinning structure through a proper selection of the magnetic thickness of each first ferromagnetic layer 103 and/or second ferromagnetic layer 105.

Yet further, the output signal of the differential CPP dual spin valve magnetic recording read head 100 may be of a double amplitude when compared to the conventional single spin valve magnetic recording read head but yet retain a similar shape and may require a smaller bandwidth than the readback signal of the convention read head in longitudinal media.

Figure 2:
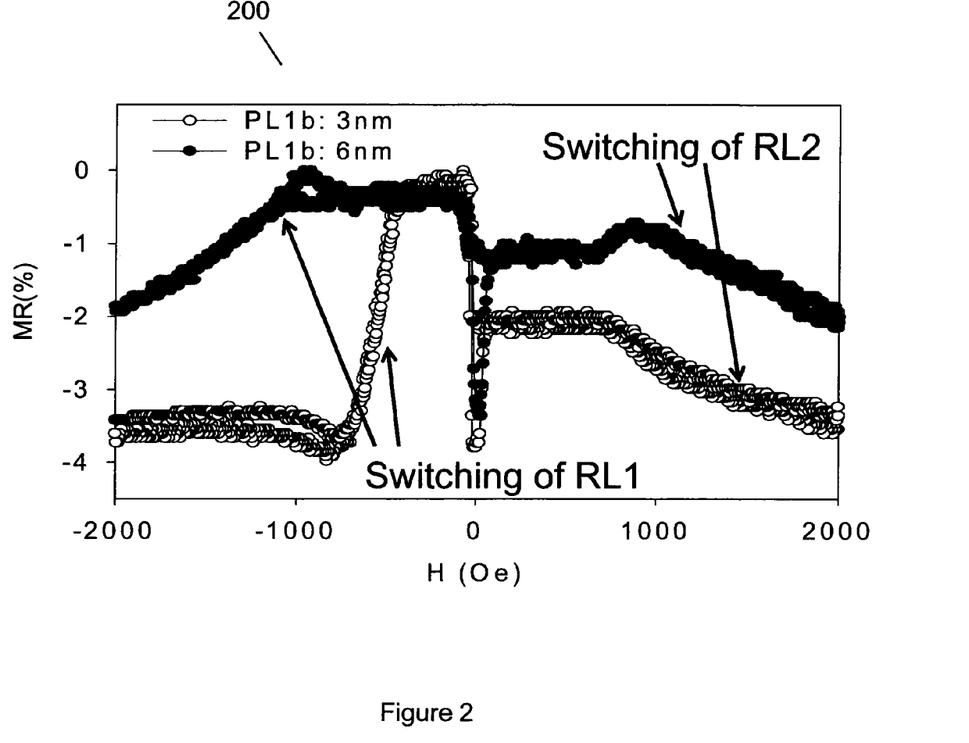
FIG. 2 shows a graph showing magnetoresistance (MR)-magnetic field strength (H) curves for two differential CPP dual spin valve magnetic recording read heads with respective first further pinned layer of different thicknesses according to an embodiment.

FIG. 2 shows a graph 200 showing magnetoresistance (MR)-magnetic field strength (H) curves for two differential CPP dual spin valve magnetic recording read heads 100 with respective first further pinned layer 112 of different thicknesses according to an embodiment. Here MR is defined by the maximum resistance as $MR=(R-R_{max})/R_{max}$.

One differential CPP dual spin valve magnetic recording read head 100 may include the first further pinned layer 112 with a thickness of about 3 nm while the other read head 100 may include the first further pinned layer 112 with a thickness of about 6 nm.

In this measurement, CoFe may be used for the respective first pinned layer 108, the first further pinned layer 112, the first reference layer 116, the first free layer structure 124, the second free layer structure 128, the second reference layer 136 and the second pinned layer 140. The respective thickness of the first reference layer 116 and the second reference layer 136 may be fixed at about 3 nm while the first pinned layer 108 and the second pinned layer 140 may be about 3.5 nm.

In FIG. 2, the first reference layer 116 may be much more stable in a balanced double SAF structure (where thickness of the first further pinned layer 112 may be about 6 nm) than an unbalanced one (where thickness of the first further pinned layer 112 may be about 3 nm). By comparing the switching fields of the first reference layer 116 and the second reference layer 136 in FIG. 2, it may be seen that the balanced double SAF structure may provide a similar pinning strength as that of the single SAF structure. Another likely advantage of the balanced double SAF structure may be that there may not be a net magnetostatic field from the double SAF layers at both the first free layer structure 124 and the second free layer structure 128, thus likely overcoming an asymmetry effect. It shall be noted that the double SAF structure in the first spin valve 104 and the single SAF structure in the second spin valve 132 may be exchanged, i.e.; double SAF structure in the second spin valve 132 and single SAF structure in the first spin valve 104.

FIGS. 3A to 3D show respective illustrations of working principles of a differential CPP dual spin valve magnetic recording read head 100 for perpendicular recording according to an embodiment.

Figure 3A:
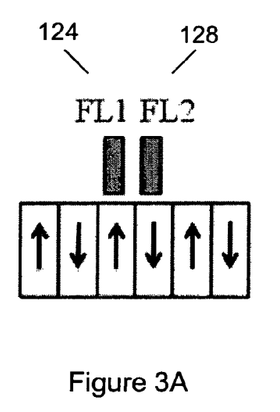
FIGS. 3A to 3D show respective illustrations of working principles of a differential CPP dual spin valve magnetic recording read head for perpendicular recording according to an embodiment.
Figure 3B:
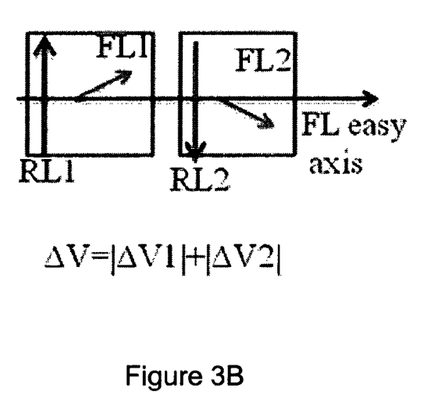
Figure 3C:
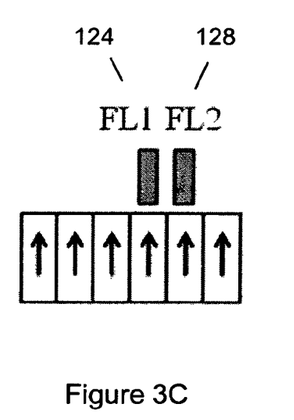

FIGS. 3A to 3D may allow one to understand how the differential CPP dual spin valve magnetic recording read head 100 works. FIGS. 3A and 3C show two typical cases where the read head 100 may be adapted to read perpendicular recording bits. It may be known in the art that the read head 100 may be configured to read a data "1" in FIG. 3A and a data "0" in FIG. 3C. For clarity, only cross-sections of the first free layer structure 124 and the second free layer structure 128 in the differential CPP dual spin valve magnetic recording read head 100 may be shown above a relevant perpendicular media, where the arrows may indicate the magnetization direction of each bit.

Figure 3D:
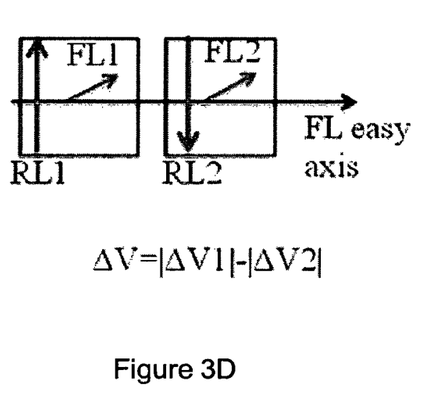

FIGS. 3B and 3D show magnetization responses to magnetic fields from the perpendicular media when the first free layer structure 124 and the second free layer structure 128 may be located in the transitions corresponding to data "1" and data "0", respectively.

As shown in FIG. 3A, when the first free layer structure 124 and the second free layer structure 128 may be located in the transition where the first free layer structure 124 may face an upward field and the second free layer structure 128 may face a downward field, the magnetizations of the first free layer structure 124 and the second free layer structure 128 may be rotated upward and downward, respectively. As shown in FIG. 3B, the magnetizations of both the first free layer structure 124 and the second free layer structure 128 may rotate towards parallel states with their respective first reference layer 116 and second reference layer 136, thereby causing a decrease in resistance. Therefore, total resistance change and signal output ($\Delta V$), may be equal to an addition of the respective signal output of each of the first spin valve 104 ($\Delta V1$) and the second spin valve 132 ($\Delta V2$). If the first spin valve 104 and the second spin valve 132 may have the same GMR effect, $\Delta V1=\Delta V2$, then the total output signal ($\Delta V$), in the differential CPP dual spin valve magnetic recording read head 100 may be about twice that in the single CPP spin valve read head 100.

For a data "0", it may be seen from FIGS. 3C and 3D, the first free layer structure 124 may be driven towards the parallel magnetization configuration, thus reducing the resistance of the first spin valve 104, while the second free layer structure 128 may be driven towards the anti-parallel configuration, thus increasing resistance of the second spin valve 132. The resistance change of the first spin valve 104 and the second spin valve 132 may compensate each other, therefore, the output signal ($\Delta V$) of the differential CPP dual spin valve magnetic recording read head 100 may be substantially zero if the resistance response of the first spin valve 104 and the second spin valve 132 to a magnetic field may be the same.

Figure 4A:
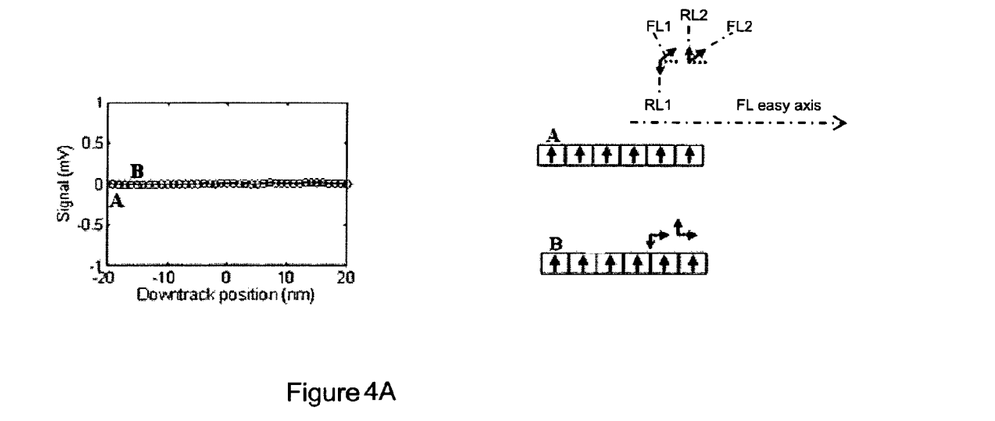
FIGS. 4A to 4C show respective illustrations of a simulated signal output of a differential CPP dual spin valve magnetic recording read head when reading three types of data patterns according to an embodiment.
Figure 4B:
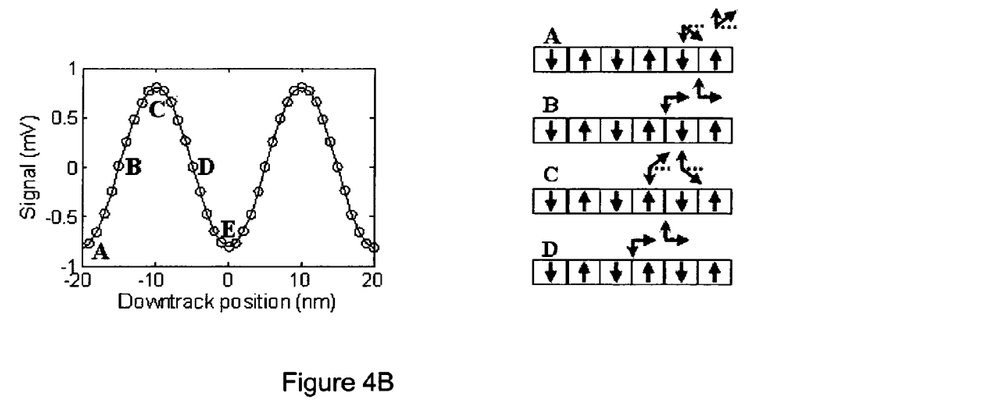
Figure 4C:
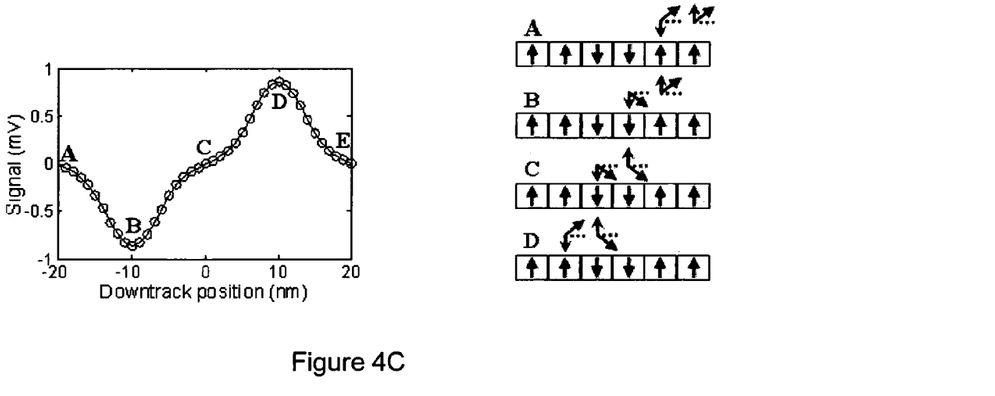

FIGS. 4A to 4C show respective illustrations of a simulated signal output of a differential CPP dual spin valve magnetic recording read head 100 when reading three types of data patterns according to an embodiment.

FIGS. 4A to 4C show respective typical simulated signal outputs from the differential CPP dual spin valve for respective data patterns 000000, 111111 and 010101. In the simulation, the resistance change of the first spin valve 104 and the second spin valve 132 may be assumed to be the same.

For data pattern 000000, FIG. 4A shows that there may be no magnetic transition. The perpendicular media may produce a uniform field at the read head 100. The respective magnetization directions of the first free layer structure 124 and the second free layer structure 128 may rotate along the same direction as their respective reference layer magnetization (i.e. first reference layer 116 and second reference layer 136) may be opposite. The respective resistance change may cancel each other and therefore no signal output may be found.

For data pattern 111111, FIG. 4B shows the signal output when the read head 100 may be moving along down track direction. The right part of FIG. 4B shows the different locations of the first free layer structure 124 and the second free layer structure 128 over the perpendicular media bits. The signal of each bit may be well separated, showing extremely high linear density.

To further explore the linear resolution of the differential CPP dual spin valve magnetic recording read head 100, FIG. 4C shows the signal output from the differential CPP dual spin valve magnetic recording read head 100 when passing through the data pattern 010101. When the read head or reader 100 may be located over a transition (data "1"), the read head 100 may show an output of either positive or negative, while nearly no output may be found for no transition bits.

As can be seen from FIGS. 4A to 4C, the signal output from the differential CPP dual spin valve magnetic recording read head 100 may be quite similar to that from a typical read head 100 in longitudinal recording media. Therefore, a conventional read channel may be used for the differential CPP dual spin valve magnetic recording read head 100.

It may be known that the signal profile shown in FIGS. 4A to 4C may be easier to process and may requires less bandwidth in comparison with those from the typical read head 100 in perpendicular media. This may be another advantage the presented embodiments have over conventional read heads.

In practical terms, magnetoresistance (MR) of the differential CPP dual spin valve magnetic recording read head 100 in an uniform field (as shown in FIG. 4A) shall be as small as possible in a dynamic range.

Figure 5A:
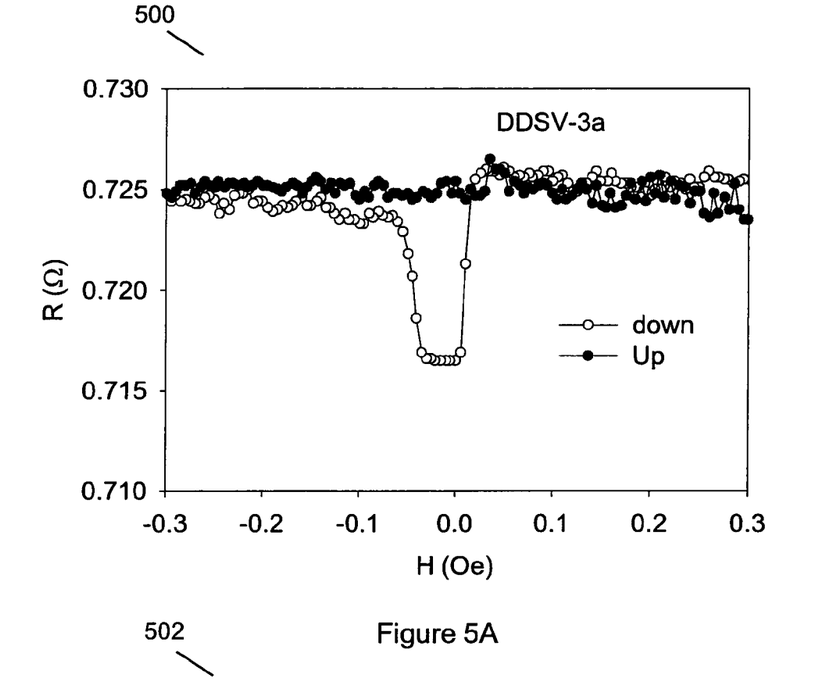
FIG. 5A shows a graph of a comparison of a magnetoresistance performance of a differential dual spin valve (DDSV) according to an embodiment.
Figure 5B:
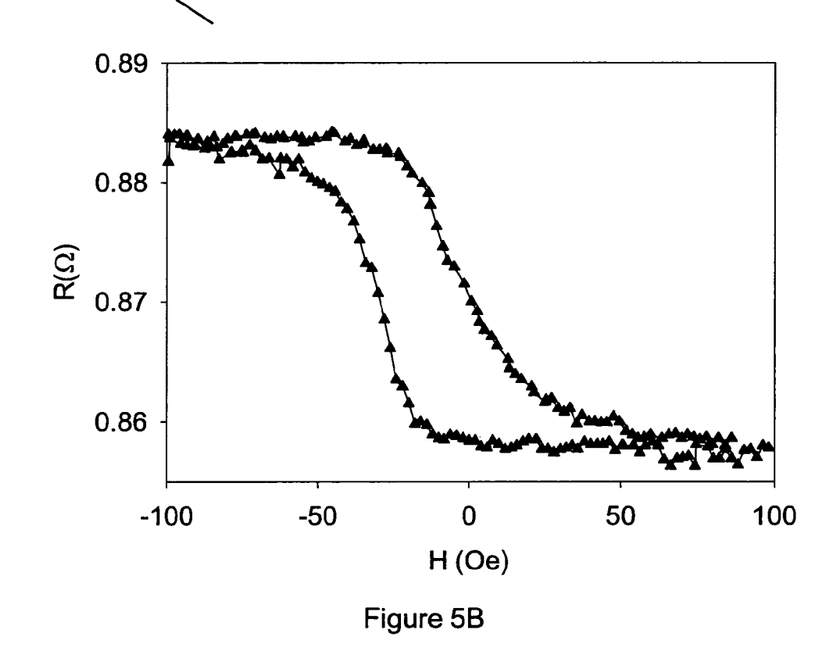
FIG. 5B shows a graph of a comparison of a magnetoresistance performance of an added dual spin valve (ADSV) according to an embodiment.

FIG. 5A shows a graph 500 of a comparison of a magnetoresistance performance of a differential dual spin valve (DDSV) 504 according to an embodiment and FIG. 5B shows a graph 502 of a comparison of a magnetoresistance performance of an added dual spin valve (ADSV) 506 according to an embodiment.

The DDSV 504 may include a double SAF coupling pinning structure in a first spin valve 104 and a single SAF coupling pinning structure in a second spin valve 132, the ADSV 506 may include only a single SAF coupling pinning structure in each of the first spin valve 104 and second spin valve 132 and thus the RL magnetization of the ADSV 506 may be parallel for both the first spin valve 104 and the second spin valve 132. As an example, the structure of the ADSV 506 may be Ta5/Cu10/Ta15/NiFe2/IrMn8/CoFe3.5/Ru0.8/CoFe3/Cu3/CoFe3/Ta3/CoFe3/Cu3/CoFe3/Ru0.8/CoFe3.5/IrMn8/Ta5/Ru5 and the structure of the DDSV 504 may be Ta5/Cu10/Ta15/NiFe2/IrMn8/CoFe3.5/Ru0.8/CoFe3/Ru0.8/CoFe3/Cu3/CoFe3/Ta3/CoFe3/Cu3/CoFe3/Ru0.8/CoFe3.5/IrMn8/Ta5/Ru5. The numbers in the respective ADSV structure 506 and DDSV structure 504 may be the thickness of each layer in nanometer.

FIG. 5A may show resistance changes of the DDSV 504 at a low magnetic field region (dynamic range). No hard bias may be applied in the read head 100 and an easy axis of the free layer structures 124, 128 may be parallel to the magnetization of the respective reference layers 116, 136. When the magnetic field may be increased from negative maximum to the positive maximum, there may almost be no resistance change due to the differential effect. When the magnetic field may be reduced from positive to negative, two steps of transition may be found. This may be due to an interlayer coupling between the respective first free layer structure 124 and the first reference layer 116 and between the second free layer structure 128 and the second reference layer 136. As the RL magnetizations of the first spin valve 104 and the second spin valve 132 may be in an AP state, the ferromagnetic (FM) coupling may cause the first free layer structure 124 to switch at a negative field, while the second free layer structure 128 may switch at a positive field. With the proper designed hard bias, this effect may be suppressed or eliminated. Note that perfect cancellation may be found when the two FL magnetizations may rotate coincidentally at about zero magnetic field during ramping of the magnetic field from negative to positive value.

As reading performance of the DDSV 504 may be evaluated only at a system level with a spin stand, it may be possible to deposit another dual spin valve with the ADSV structure 506 to simulate the performance of the read head 100 for a data transition. In the ADSV 506, two RL magnetizations may be aligned at a parallel state; the signal output under uniform fields may be doubled, which may simulate the DDSV 504 at the magnetic transition. Instead of opposite field directions in the adjacent bits for the reading performance of the DDSV 504, it may be possible to align the RL magnetizations in parallel with the uniform field. As shown in FIG. 5B, the amplitude of the ADSV 506 may be twice as high as the GMR effect in the DDSV 504 at low fields, where only one layer switching may be involved.

Figure 6:
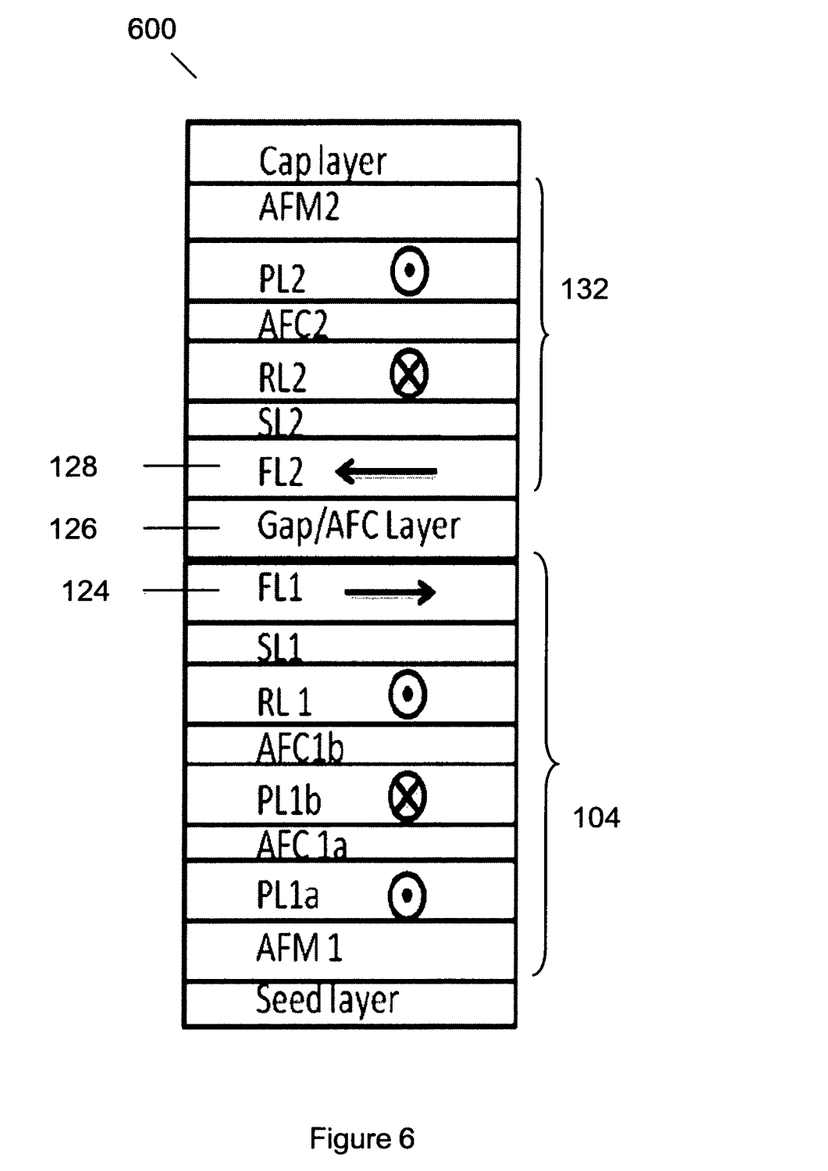
FIG. 6 shows a schematic of a differential CPP dual spin valve magnetic recording read head including two spin valves physically separated by a gap layer, with anti-parallel magnetization states of two free layer structures in the two spin valves and without hard biasing according to an embodiment.

FIG. 6 shows a schematic of a differential CPP dual spin valve magnetic recording read head 600 including two spin valves 104, 132 physically separated by a gap layer 126, with anti-parallel magnetization states of two free layer structures 124, 128 in the two spin valves 104, 132 and without hard biasing according to an embodiment.

The differential CPP dual spin valve magnetic recording read head 600 as shown in FIG. 6 may be similar to that as shown in FIG. 1 with the difference such that the magnetization directions of the first free layer structure 124 and the second free layer structure 128 may be anti-parallel in FIG. 6 but may be parallel in FIG. 1. Further the first free layer structure 124 and the second free layer structure 128 in FIG. 1 may be externally biased by the pair of permanent magnets 148, 150 while the first free layer structure 124 and the second free layer structure 128 in FIG. 6 may not be externally biased but self-biased.

In FIG. 6, the hard bias or the pair of permanent magnets 148, 150 previously used in the read head 100 in FIG. 1 for stabilizing the first free layer structure 124 and the second free layer structure 128 may be removed. Instead as shown in FIG. 6, in order to stabilize the magnetization directions of the first free layer structure 124 and the second free layer structure 128, the first free layer structure 124 and the second free layer structure 128 may be anti-ferromagnetically coupled to form an AP configuration. In addition, the respective AP first free layer structure 124 in the first spin valve or spin valve layered structure 104 and the second free layer structure 128 in the second spin valve or spin valve layered structure 132 may form a flux-closed self-biasing structure. The AFM coupling strength between the first free layer structure 124 and the second free layer structure 128 may be tuned by changing the material and the thickness of the gap layer 126. The thickness of the gap layer 126 may be determined by linear resolution roughly according to: 1 bit length=averaged thickness of respective first free layer structure 124 and second free layer structure 128 and half of the thickness of the gap layer 126. To effectively adjust the AFM coupling through the gap layer 126, the preferred thickness of the gap layer 126 may be from about 0.7 nm to about 20 μm. The preferred materials for the gap layer 126 may be Ru, Cu or Ta and Cr for example.

In order to tune sensitivity of the read head 100, the AFM coupling between the respective first free layer structure 124 and the second free layer structure 128 must be controlled. A method to control the AFM coupling between the first free layer structure 124 and the second free layer structure 128 may be to use a multilayer structure for the gap layer 126. The AFM coupling in a read head 100 may be mainly composed of magnetostatic coupling (AFM), orange peel coupling (ferromagnetic (FM) coupling) and exchange coupling through interlayer (can be both AFM and FM coupling, depending on interlayer thickness). For smooth read head layers, the FM coupling from the orange peel effect may be unimportant. As the size of the read head 100 decreases, the magnetostatic coupling may increase, while exchange coupling may be dependent on the interlayer materials and thickness. Ru may be the best known material for the interlayer (i.e. the gap layer 126) to provide a strong AFM or FM coupling, depending its thickness. To further tune the AFM coupling, a multilayer structure which may include Ru/Cu or Ru/Ta may be used. Depending on thickness of each layer in the multilayer structure and materials (such as Ru/Cu, Ru/Ta), the AFM coupling strength may be tuned.

Another method to control the AFM coupling between the first free layer structure 124 and the second free layer structure 128 may be to use multilayer structure for the respective first free layer structure 124 and the second free layer structure 128, e.g., CoFe/NiFe. As the AFM coupling strength may be dependent on the interface between the AFM layer and the ferromagnetic layer, the desired AFM coupling strength may be obtained using different free layer structure materials. For example, when Ru may be used for the gap layer 126, the AFM coupling between the first free layer structure 124 and the second free layer structure 128 may be significantly reduced using a structure of CoFe/NiFe/Ru/NiFe/CoFe where CoFe/NiFe may be respectively used as the first free layer structure 124 and the second free layer structure 128, instead of CoFe/Ru/CoFe.

Figure 8:
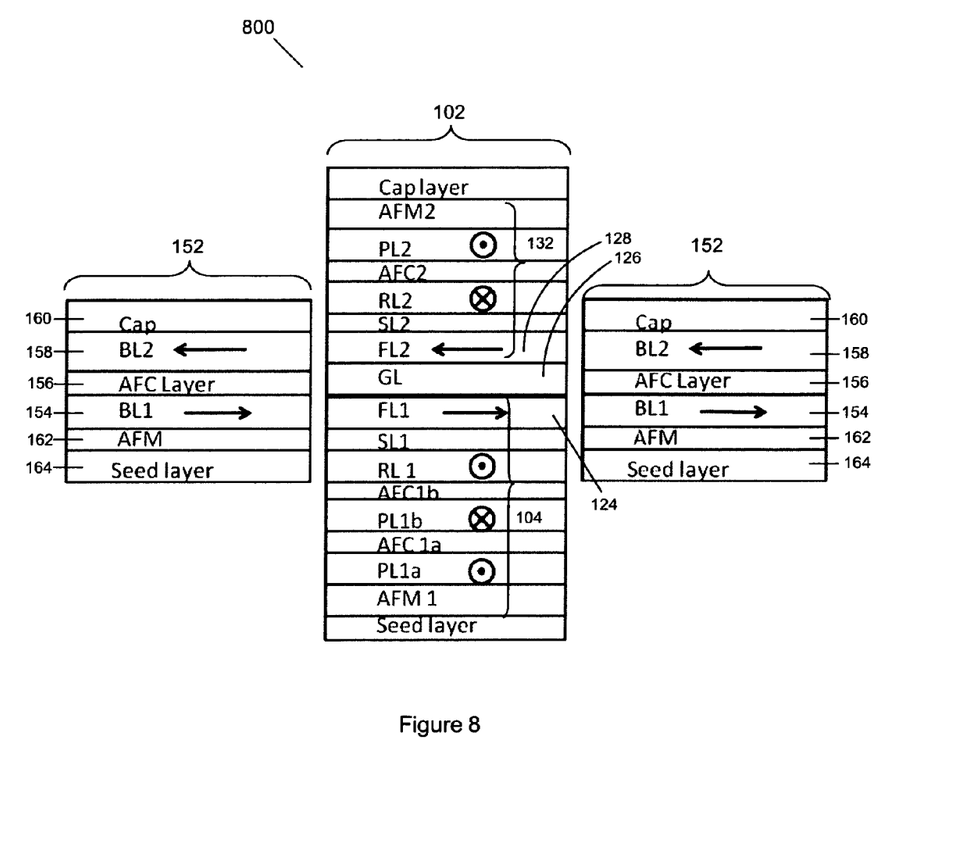
FIG. 8 shows a schematic of a differential CPP dual spin valve magnetic recording read head including two spin valves physically separated by a gap layer, with anti-parallel magnetization states of two free layer structures in the two spin valves and biased by a pair of synthetic anti-ferromagnetic biased structures according to an embodiment.

Finally, the AFM coupling between the first free layer structure 124 and the second free layer structure 128 may also be controlled through biasing the first free layer structure 124 and the second free layer structure 128 in an anti-parallel orientation as shown in either FIG. 6 or FIG. 8.

Due to the absence of hard bias in FIG. 6, the fabrication process of the read head 600 may become much simpler compared to that of FIG. 1. As the first free layer structure 124 and the second free layer structure 128 form a flux-closed structure, the read head 600 may become more stable and provide differential effect on the field from adjacent tracks, thus increasing track density significantly.

Figure 7:
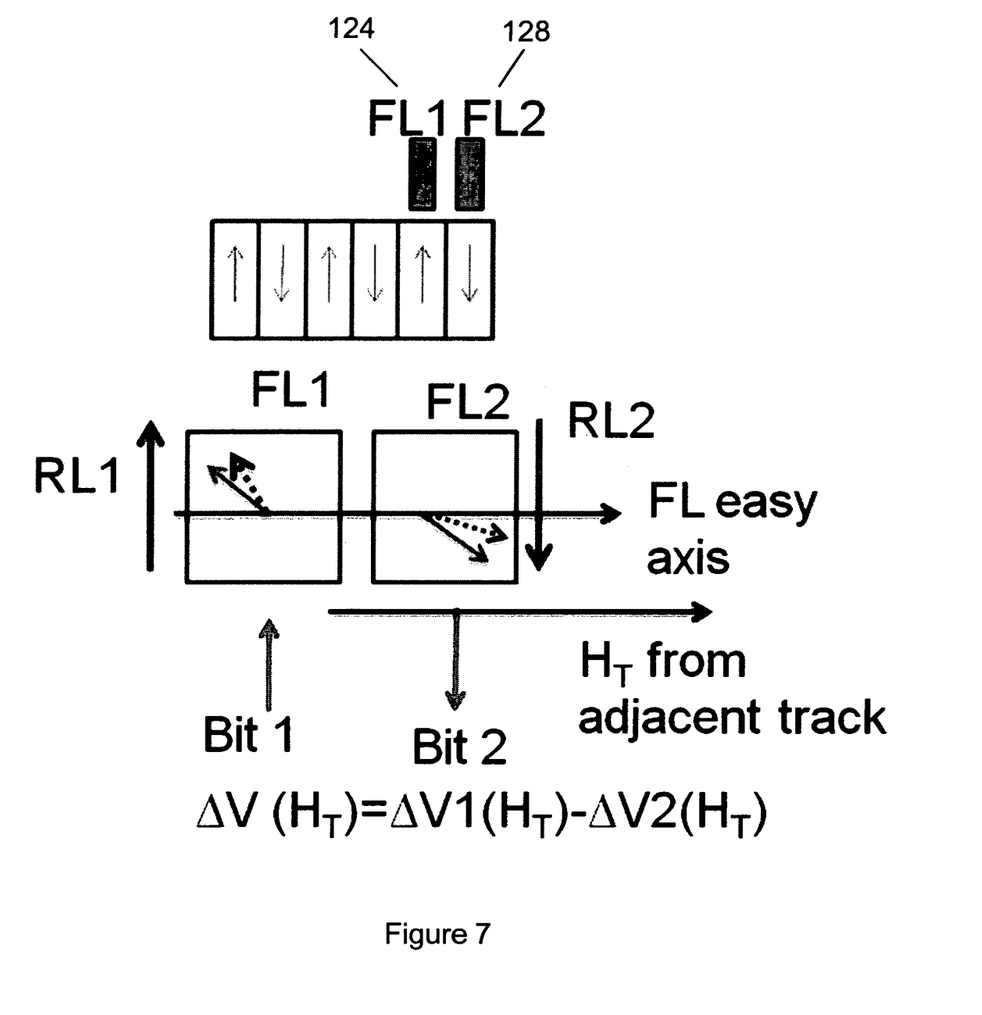
FIG. 7 show an illustration of a working principle of a differential CPP dual spin valve magnetic recording read head for perpendicular recording, showing differential effect on the transverse magnetic field for adjacent tracks according to an embodiment.

FIG. 7 show an illustration of a working principle of a differential CPP dual spin valve magnetic recording read head (e.g. the magnetic recording read head 100 or the magnetic recording read head 600) for perpendicular recording, showing differential effect on the transverse magnetic field for adjacent tracks according to an embodiment.

To avoid reading magnetic field from other bits, total thickness of the respective first free layer structure 124 (with thickness of $t_1$), the second free layer structure 128 (with thickness of $t_2$), and the gap layer 126 (with thickness of $t_g$), may be around two bit lengths, depending on the head-media spacing. For a certain resolution, it may be better to select $t_1$ and $t_2$ to be as large as possible so as to increase the sensor stability. In practical application, $t_1$ and $t_2$ may range from about 1 nm to about 10 nm. For $t_g$, it may be better to have a value as small as possible so as to increase the resolution. However, it may have to be determined based on the consideration of the interlayer coupling between two FLs 124, 128. Bit length may be defined by $t_1$, $t_2$ and $t_g$ instead of the total thickness of the differential CPP dual spin valve read head (e.g. the magnetic recording read head 100 or the magnetic recording read head 600). As $t_1$, $t_2$ and $t_g$ may be as small as about 1 nm, a bit length as small as about 1.5 nm may be achieved, which may correspond to a linear density of 16,864 Kbpi (bits-per-inch).

To further illustrate the differential effect on the magnetic field from the adjacent tracks, FIG. 7 shows a response of the FL magnetization to the longitudinal field from the adjacent tracks when the read head (e.g. the magnetic recording read head 100 or the magnetic recording read head 600) may be reading a data "1" which may produce transverse fields with opposite directions at the first free layer structure 124 and the second free layer structure 128 from the bit 1 and bit 2, respectively. The longitudinal field effect on the respective first free layer structure 124 magnetization and second free layer structure 128 magnetization may be as shown by dash arrows. The longitudinal field may drive the first free layer structure 124 towards the first reference layer 116, reducing resistance of the first spin valve 104, while the second free layer structure 128 may be driven towards anti-parallel to the second reference layer 136, increasing resistance of the second spin valve 132. The total output signal may be kept unchanged due to the differential effect. Therefore, the distance between the two tracks may be reduced to increase track density.

FIG. 8 shows a schematic of a differential CPP dual spin valve magnetic recording read head 800 including two spin valves 104, 132 physically separated by a gap layer 126, with anti-parallel magnetization states of two free layer structures 124, 128 in the two spin valves 104, 132 and biased by a pair of synthetic anti-ferromagnetic biased structures 152 according to an embodiment.

The differential CPP dual spin valve magnetic recording read head 800 as shown in FIG. 8 may include a sensor 102 similar to that as shown in FIG. 6. Further, the differential CPP dual spin valve magnetic recording read head 800 as shown in FIG. 8 may provide more selections to bias the FLs 124, 128 of the two spin valves 104, 132.

In FIG. 8, the AFM coupling may be further tuned through a pair of biasing structures 152 respectively located adjacent to the first free layer structure 124 and the second free layer structure 128. Each of the pair of biasing structures 152 may include a synthetic anti-ferromagnetic (SAF) structure which may be a multi-layer structure. Each of the SAF structure may include a typical synthetic AFM coupling structure or a pinning structure (including a pinned layer (BL1) 154, an anti-ferromagnetic coupling layer (AFC layer) 156, and a further pinned layer (BL2) 158), a capping layer (CL) 160 disposed on the further pinned layer 158, an anti-ferromagnetic layer (AFM) 162 disposed on the pinned layer 154 and a seed layer 164 disposed on the anti-ferromagnetic layer 162. Each of the pinned layer 154 and the further pinned layer 158 may include ferromagnetic materials such as CoFe, NiFe, Co, CoFeB or Heusler alloys for example. The anti-ferromagnetic coupling layer 156 may include Ru, Cr or any combination of metal multilayers. The magnetic thickness ($M_s.t$) of the pinned layer 154 and the further pinned layer 158 may need to be larger than that of the respective first free layer structure 124 and the second free layer structure 128, to provide a strong biasing field to the first free layer structure 124 and the second free layer structure 128.

The AFM coupling may also be provided by magnetostatic and exchange Ruderman-Kittel-Kasuya-Yosida (RICKY) coupling at a device level. The AFM coupling strength between the first free layer structure 124 and the second free layer structure 128 may be further tuned by changing the materials of the respective first free layer structure 124 and second free layer structure 128, e.g., multilayer such as CoFe/NiFe and CoFe/CoFeB. The gap layer 126 may include any metals such as Ru, Cr, Ta or Cu, which may provide an AFM coupling between the first free layer structure 124 and the second free layer structure 128.

Figure 9:
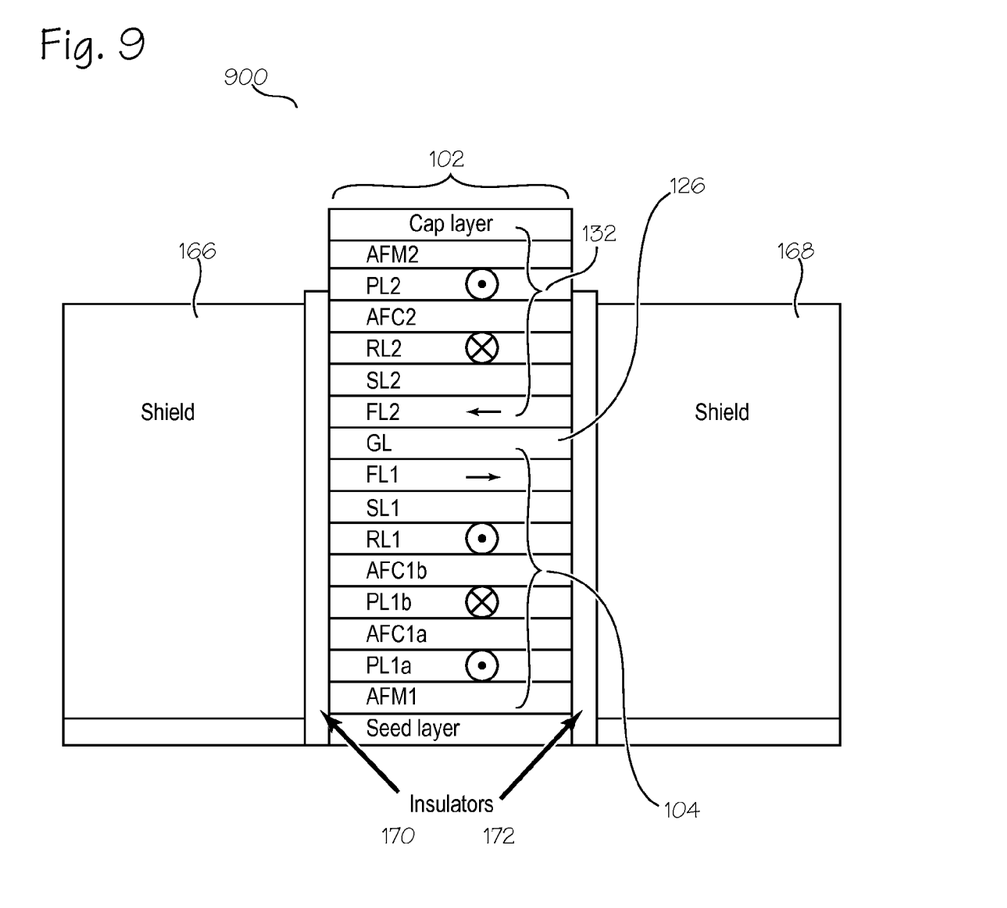
FIG. 9 shows a schematic of a differential CPP dual spin valve magnetic recording read head including two spin valves physically separated by a gap layer, with a pair of side shields according to an embodiment.

FIG. 9 shows a schematic of a differential CPP dual spin valve magnetic recording read head 900 including two spin valves 104, 132 physically separated by a gap layer 126, with a pair of side shields 166, 168 according to an embodiment.

The differential CPP dual spin valve magnetic recording read head 900 as shown in FIG. 9 may include a sensor 102 similar to that as shown in FIG. 6.

In FIG. 9, a first magnetic shield 166 and a second magnetic shield 168 may be disposed at each respective side of the sensor 102. The first magnetic shield 166 and the second magnetic shield 168 may serve as the shielding of magnetic flux from the adjacent, thus reducing the side reading and increasing the track density.

Further, the first magnetic shield 166 may be separated from the sensor 102 by a first insulator 170 and the second magnetic shield 168 may be separated from the sensor 102 by a second insulator 172 to avoid respective electrical shunting between the first magnetic shield 166 and the sensor 102 and between the second magnetic shield 168 and the sensor 102.

Each of the respective first magnetic shield 166 and the second magnetic shield 168 may include a soft ferromagnetic layer selected from a group consisting of NiFe, CoFe, NiFeB, for example. Each of the respective first insulator 170 and the second insulator 172 may include an oxide selected from a group consisting of SiOx, AlOx, MgO, TiOx, for example.

In addition, in FIG. 9, the anti-parallel arrangement of the first free layer structure 124 and the second free layer structure 128 may be formed by an anti-ferromagnetic interlayer coupling and a magnetostatic coupling. As a result, the first free layer structure 124 and the second free layer structure 128 may be biased by each other, forming a flux close structure. This may be different from a conventional reader structure where the sensor 102 may be biased by the hard bias. As there may not be space for the side shield in the conventional reader structure, there may be a relatively substantial interference from adjacent tracks. The track pitch may be much larger than the track width of the sensor 102 to reduce the interference. With the flux close structure and thereby the side magnetic shields 166, 168, the track pitch may be close to the track width of the sensor 102, thus increasing track resolution significantly.

In general, referring to the respective differential CPP dual spin valve magnetic recording read head 100, 600, 800, 900 as shown in FIGS. 1, 6, 8 and 9, it may be shown that there may be three first ferromagnetic layers 103 (the first pinned layer 108, the first further pinned layer 112 and the first reference layer 116) in the first pinning structure 106 of the first spin valve 104 and two second ferromagnetic layers 105 (the second pinned layer 140 and the second reference layer 136) in the second pinning structure 134 of the second spin valve 132. However, it may be noted that the sensor 102 may be easily modified to any odd (even) number of first ferromagnetic layers 103 in the first pinning structure 106 of the first spin valve 104 (or bottom spin valve) and any even (odd) number of second ferromagnetic layers 105 in the second pinning structure 134 of the second spin valve 132 (or top spin valve). Accordingly, the even (odd) number of the first anti-ferromagnetic coupling (AFC) layers 107 may be used for the first pinning structure 106 in the first spin valve 104 and the odd (even) number of second anti-ferromagnetic coupling layers 109 may be used for the second pinning structure 134 in the second spin valve 132.

It should also be noted in FIGS. 1, 6, 8 and 9 that the anti-parallel magnetic configurations of the respective first reference layer 116 and the second reference layer 136 may be realized using the same anti-ferromagnetic materials with high pinning field. Further, it may be noted that the magnetic thickness of the first pinning structure 106 or the second pinning structure 134 regardless of whether it may be used for the first spin valve 104 or the second spin valve 132 should be set close to zero to achieve a high pinning field.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A sensor arrangement, comprising a sensor, comprising:
   a first spin valve, comprising:
      a first free layer structure;
      a first pinning structure disposed over the first free layer structure; and
      a first anti-ferromagnetic layer disposed over the first pinning structure;
   a second spin valve, comprising:
      a second free layer structure;
      a second pinning structure disposed over the second free layer structure; and
      a second anti-ferromagnetic layer disposed over the second pinning structure; and
   a separator structure positioned between the first spin valve and the second spin valve such that the separator structure is in contact with the first free layer structure and the second free layer structure;
   wherein the first pinning structure comprises an odd number of first ferromagnetic layers and the second pinning structure comprises an even number of second ferromagnetic layers so as to enable the sensor to provide a differential signal when a current flows through the sensor.

2. The sensor arrangement of claim 1, wherein the first anti-ferromagnetic layer and the second anti-ferromagnetic layer are of the same material.

3. The sensor arrangement of claim 1, wherein the first pinning structure further comprises an even number of first anti-ferromagnetic coupling layers, wherein each of the odd number of first ferromagnetic layers is separated from another of the odd number of first ferromagnetic layers by at least one of the even number of first anti-ferromagnetic coupling layers.

4. The sensor arrangement of claim 3, wherein the first pinning structure comprises at least one more layer of the odd number of first ferromagnetic layers than the even number of first anti-ferromagnetic coupling layers.

5. The sensor arrangement of claim 3, wherein the odd number of first ferromagnetic layers comprises a first pinned layer, a first further pinned layer and a first reference layer.

6. The sensor arrangement of claim 5, wherein the even number of first anti-ferromagnetic coupling layers comprises a first sub-anti-ferromagnetic coupling layer and a first further sub-anti-ferromagnetic coupling layer.

7. The sensor arrangement of claim 6, wherein the first sub-anti-ferromagnetic coupling layer is disposed between the first pinned layer and the first further pinned layer so as to form an anti-ferromagnetic coupling between the first pinned layer and the first further pinned layer such that the first pinned layer is of a different magnetization direction from the first further pinned layer.

8. The sensor arrangement of claim 6, wherein the first further sub-anti-ferromagnetic coupling layer is disposed between the first further pinned layer and the first reference layer so as to form an anti-ferromagnetic coupling between the first further pinned layer and the first reference layer such that the first further pinned layer is of a different magnetization direction from the first reference layer.

9. The sensor arrangement of claim 5, wherein the first anti-ferromagnetic layer is disposed in contact with the first pinned layer such that the first anti-ferromagnetic layer is configured to fix a magnetization direction of the first pinned layer through exchange coupling between the first anti-ferromagnetic layer and the first pinned layer.

10. The sensor arrangement of claim 5, wherein the even number of second ferromagnetic layers comprises a second reference layer and a second pinned layer.

11. The sensor arrangement of claim 10, wherein the odd number of second anti-ferromagnetic coupling layers comprises a second sub-anti-ferromagnetic coupling layer.

12. The sensor arrangement of claim 11, wherein the second sub-anti-ferromagnetic coupling layer is disposed between the second pinned layer and the second reference layer so as to form an anti-ferromagnetic coupling between the second pinned layer and the second reference layer such that the second pinned layer is of a different magnetization direction from the second reference layer.

13. The sensor arrangement of claim 10, wherein the second anti-ferromagnetic layer is disposed in contact with the second pinned layer such that the second anti-ferromagnetic layer is configured to fix a magnetization direction of the second pinned layer through exchange coupling between the second anti-ferromagnetic layer and the second pinned layer.

14. The sensor arrangement of claim 10, wherein the first reference layer and the second reference layer are of different magnetization directions.

15. The sensor arrangement of claim 1, wherein the second pinning structure further comprises an odd number of second anti-ferromagnetic coupling layers, wherein each of the even number of second ferromagnetic layers is separated from another of the even number of second ferromagnetic layers by at least one of the odd number of second anti-ferromagnetic coupling layers.

16. The sensor arrangement of claim 15, wherein the second pinning structure comprises at least one more layer of the even number of second ferromagnetic layers than the odd number of second anti-ferromagnetic coupling layers.

17. The sensor arrangement of claim 1, wherein the first anti-ferromagnetic layer and the second anti-ferromagnetic layer are of the same magnetization direction.

18. The sensor arrangement of claim 5, wherein the first further pinned layer comprises a magnetic thickness substantially equal to a combined magnetic thickness of the first pinned layer and the first reference layer.

19. The sensor arrangement of claim 1, further comprising a first magnetic shield and a second magnetic shield, wherein the first magnetic shield is arranged on one side of the sensor and the second magnetic shield is arranged on an opposing side of the sensor so as to shield magnetic flux from adjacent tracks to eliminate interference.

20. The sensor arrangement of claim 19, further comprising
   a first insulator positioned between the first magnetic shield and the one side of the sensor and a second insulator positioned between the second magnetic shield and the opposing side of the sensor to avoid respective electrical shunting between the first magnetic shield and the sensor and between the second magnetic shield and the sensor.

* * * * *